United States Patent
Utsunomiya et al.

(10) Patent No.: US 10,611,324 B2
(45) Date of Patent: Apr. 7, 2020

(54) CONNECTION STRUCTURE BODY AND ROTARY CONNECTOR APPARATUS PROVIDED WITH CONNECTION STRUCTURE BODY

(71) Applicants: FURUKAWA ELECTRIC CO., LTD., Tokyo (JP); FURUKAWA AUTOMOTIVE SYSTEMS INC., Inukami-gun, Shiga (JP)

(72) Inventors: Hirofumi Utsunomiya, Inukami-gun (JP); Masashi Kanazawa, Inukami-gun (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days.

(21) Appl. No.: 16/406,786

(22) Filed: May 8, 2019

(65) Prior Publication Data

US 2019/0263337 A1 Aug. 29, 2019

Related U.S. Application Data

(63) Continuation of application No. PCT/JP2017/038837, filed on Oct. 27, 2017.

(30) Foreign Application Priority Data

Nov. 9, 2016 (JP) .................................. 2016-219165

(51) Int. Cl.
*H01R 3/00* (2006.01)
*B60R 16/027* (2006.01)
(Continued)

(52) U.S. Cl.
CPC .............. *B60R 16/027* (2013.01); *B62D 1/04* (2013.01); *H01R 4/58* (2013.01); *H01R 35/04* (2013.01)

(58) Field of Classification Search
CPC ........ B60R 16/027; H01R 4/58; H01R 35/04; B62D 1/04
(Continued)

(56) References Cited

U.S. PATENT DOCUMENTS

| 8,845,348 B2 * | 9/2014 | Yamawaki | B60R 16/027 439/164 |
| 8,851,901 B2 * | 10/2014 | Hiroki | B60R 16/027 439/15 |
| 8,974,234 B2 * | 3/2015 | Takahashi | B60R 16/027 439/15 |

FOREIGN PATENT DOCUMENTS

| EP | 1 052 743 A1 | 11/2000 |
| JP | 2000-323254 A | 11/2000 |

(Continued)

OTHER PUBLICATIONS

International Preliminary Report on Patentability and English translation of the Written Opinion of the International Searching Authority (PCT/IB/373 and PCT/ISA/237), dated May 14, 2019, for International Application No. PCT/JP2017/038837.

(Continued)

*Primary Examiner* — Khiem M Nguyen
(74) *Attorney, Agent, or Firm* — Birch, Stewart, Kolasch & Birch, LLP

(57) ABSTRACT

Provided is a connection structure body capable of detecting a break with ease and high accuracy and achieving high connection reliability and safety. A connection structure body 2 includes a first FFC (41), a stator side primary molding body (50), and a rotator side primary molding body (60) which are attached to both end portions (41A) and (Continued)

(41B) of the first FFC respectively and are able to make an electrical connection between the first FFC and the outside. The rotator side primary molding body 60 includes busbars (61-1*a*), (61-1*b*), (61-1*c*), and (61-1*d*) arranged in parallel to each other corresponding to busbars (51-1*a* to 51-1*d*), a conductive portion (61-2) that electrically connects a pair of busbars (61-1*a*) and (61-1*d*) positioned on both ends respectively in the alignment direction of the busbars (61-1*a* to 61-1*d*), and a busbar case (62) for holding the busbars (61-1*a* to 61-1*d*) in such a manner that the busbars (61-1*a* to 61-1*d*) are partly exposed. The busbars (61-1*a*) and (61-1*d*) and the conductive portion (61-2) constitute an abnormality detection circuit by forming a part of a closed circuit.

10 Claims, 6 Drawing Sheets

(51) Int. Cl.
  *B62D 1/04* (2006.01)
  *H01R 4/58* (2006.01)
  *H01R 35/04* (2006.01)
(58) Field of Classification Search
  USPC .................................................. 439/164, 162
  See application file for complete search history.

(56) References Cited

FOREIGN PATENT DOCUMENTS

| | | | |
|---|---|---|---|
| JP | 2001-15240 | A | 1/2001 |
| JP | 2007-281575 | A | 10/2007 |
| JP | 2010-52166 | A | 3/2010 |
| JP | 2012-79411 | A | 4/2012 |
| JP | 2012-216457 | A | 11/2012 |
| JP | 5557677 | B2 | 7/2014 |
| WO | WO 2010/026123 | A1 | 3/2010 |

OTHER PUBLICATIONS

International Search Report for PCT/JP2017/038837 dated Jan. 30, 2018.
Written Opinion of the International Searching Authority for PCT/JP2017/038837 (PCT/ISA/237) dated Jan. 30, 2018.
Chinese Office Action and Search Report dated Dec. 30, 2019 in corresponding Chinese Patent Application No. 201780067439.8, with English translation.

\* cited by examiner

CONNECTION STRUCTURE BODY AND ROTARY CONNECTOR APPARATUS PROVIDED WITH CONNECTION STRUCTURE BODY

CROSS REFERENCE TO RELATED APPLICATIONS

This is a continuation application of International Patent Application No. PCT/JP2017/038837 filed Oct. 27, 2017, which claims the benefit of Japanese Patent Application No. 2016-219165, filed Nov. 9, 2016, the full contents of all of which are hereby incorporated by reference in their entirety.

TECHNICAL FIELD

The disclosure relates to a connection structure body and a rotary connector device provided with the connection structure body and particularly relates to a connection structure body constituting a circuit formed of a flexible flat cable, and a rotary connector device provided with the connection structure body.

BACKGROUND ART

In a vehicle such as a four-wheeled automobile, a rotary connector device for supplying electric power to an airbag device or the like is attached to a connecting portion between a steering wheel for steering and a steering shaft. The rotary connector device is attached to the steering shaft to surround the same, and a steering column cover is installed to enclose the rotary connector device and an end portion of the steering shaft. In addition, on a steering wheel side, a steering lower cover is installed to enclose a boss portion of the steering wheel.

The rotary connector device includes a stator, a rotor that is rotatably attached to the stator, and a flexible flat cable (FFC) that is wound and housed in an annular space formed by the stator and the rotor. The FFC has a laminated structure in which a plurality of metallic conductor portions are sandwiched between two insulating films formed of resin via an adhesive layer, and a connection tool that is known as a primary molding body, which is for the electrical connection to the outside, is provided at an end portion of the FFC. The connection structure body formed of the FFC and the connection portion constitutes an electric circuit corresponding to various kinds of device such as an air bag mounted on a vehicle.

A conventional rotary connector device, for example, includes a fixation side housing, a movable side housing concentrically and rotatably coupled with the fixation side housing, two flexible cables housed in an annular cable housing space formed between the aforementioned housings, and a moving body rotatably housed in the cable housing space (see Japanese Patent Application No. JP 2001-15240 A). In the rotary connector device, two conductors for an airbag circuit, four conductors for a horn circuit, and a switch circuit are held in a first flexible cable out of the two flexible cables, with these two conductors each having a large line width and these four conductors each having a narrower line width than the large line width, while eight conductors for a horn circuit and a switch circuit are held in a second flexible cable out of the two flexible cables, with these eight conductors each having a narrow line.

SUMMARY

In the conventional rotary connector device, when the steering wheel of a vehicle is steered, the FFC repeats a flexion movement in response to a clockwise or counterclockwise rotation. Thus, the FFC of the rotary connector device is installed to have a length and an extra length in accordance with a predetermined number of times of rotations such that the steering wheel can rotate clockwise or counterclockwise from a neutral position for a predetermined number of times. However, in a manufacturing process of a vehicle, in some cases, the rotary connector device is installed in a state where the steering wheel is not at the neutral position, and thus a problem may arise in which a so-called excessive rotation, in which the rotator of the rotary connector device rotates a predetermined number of times or more, occurs, and this excessive rotation causes a break of the FFC or a break of a connecting portion between the FFC and a connection tool. In addition, in the conventional structure, ordinarily, a circuit for verifying a break in circuits is not provided, except for an air bag circuit, hence, under present circumstances, when a break in a circuit occurs, the break can be verified only when, for instance, a horn can no longer be sounded due to a break in a circuit thereof or when an unusual sound is sensed when the steering wheel is steered. This is not ideal in terms of connection reliability and safety.

In addition, when the excessive rotation occurs in the rotary connector device, the width direction end portion of the FFC is most likely to receive external force, hence, a break tends to occur in order, at a circuit arranged at the width direction end portion of the FFC and a circuit arranged at the width direction center portion of the FFC. Further, when the rotary connector device includes a plurality of FFCs, the respective lengths of the plurality of FFCs in the annular space formed by the stator and the rotator are different from one another, and when the excessive rotation occurs, the FFC having the shortest length out of the plurality of FFCs is easily broken, and subsequently the remaining FFCs are sequentially broken in the order of shortness in length. Therefore, it is necessary to configure a circuit capable of achieving break detection with ease and high accuracy in consideration of the aforementioned break phenomenon.

It is an object of the disclosure to provide a connection structure body and a rotary connector device capable of detecting a break with ease and high accuracy and achieving high connection reliability and safety.

In order to achieve the aforementioned object, a connection structure body according to the disclosure includes a flexible flat cable and a connection tool that is attached to one end of the flexible flat cable and is able to make an electrical connection between the flexible flat cable and outside, and the connection tool includes a plurality of busbars arranged in parallel to each other, a conductive portion configured to electrically connect a pair of busbars positioned on both ends respectively in an alignment direction of the plurality of busbars, and a first holding portion configured to hold the plurality of busbars in such a manner that the plurality of busbars are partly exposed, and the pair of busbars and the conductive portion form a part of a closed circuit, thereby constituting an abnormality detection circuit.

The connection structure body may further include another connection tool that is attached to the other end portion of the flexible flat cable and is able to make an electrical connection between the flexible flat cable and the outside, wherein the other connection tool may include another plurality of busbars arranged in parallel to each other corresponding to the plurality of busbars, and a second holding portion configured to hold the other plurality of busbars in such a manner that the other plurality of busbars are partly exposed.

The connection tool includes at least one busbar arranged in parallel between the pair of busbars, and the at least one busbar constitutes at least one electric circuit.

Preferably, the at least one electric circuit includes one of or both of a horn circuit and an air bag circuit.

In addition, in order to achieve the aforementioned object, a rotary connector device according to the disclosure includes a stator and a rotator rotatably attached to the stator, and the rotary connector device includes a connection structure body including a flexible flat cable housed in a windable and an unwindable manner in an annular space between the stator and the rotator, and a connection tool that is attached to one end of the flexible flat cable and is able to make an electrical connection between the flexible flat cable and outside, wherein the connection tool includes a plurality of busbars arranged in parallel to each other, a conductive portion configured to electrically connect a pair of busbars positioned on both ends respectively in an alignment direction of the plurality of busbars, and a first holding portion configured to hold the plurality of busbars in such a manner that the plurality of busbars are partly exposed, and wherein the pair of busbars and the conductive portion form a part of a closed circuit, thereby constituting an abnormality detection circuit.

Preferably, the stator is attached to a vehicle body of a vehicle, and the rotator is attached to a steering wheel of the vehicle, and the connection tool is housed in the rotator and provided to be connectable with an electric circuit on a steering wheel side of the vehicle.

The rotary connector device may further include another connection tool that is attached to the other end of the flexible flat cable and is able to make an electrical connection between the flexible flat cable and the outside, wherein the other connection tool may include another plurality of busbars arranged in parallel to each other corresponding to the plurality of busbars, and a second holding portion configured to hold the other plurality of busbars in such a manner that the other plurality of busbars are partly exposed.

Preferably, the stator is attached to a vehicle body of a vehicle, and the rotator is attached to a steering wheel of the vehicle, and the other connection tool is housed in the stator and provided to be connectable with an electric circuit on a main body side of the vehicle.

Preferably, the rotary connector device further includes at least another flexible flat cable wound on an outer peripheral side of the flexible flat cable in the annular space, wherein a length of the flexible flat cable that constitutes the connection structure body in the annular space is shorter than any length of the at least another flexible flat cable in the annular space.

According to the disclosure, the break detection can be performed with ease and high accuracy, and high connection reliability and safety can be achieved.

BRIEF DESCRIPTION OF DRAWINGS

FIG. 4 is a view illustrating a connection configuration on a stator side in the connection structure body in FIG. 3.

FIG. 5 is a view illustrating a connection configuration on a rotator side in the connection structure body in FIG. 3.

FIG. 6 is a schematic view illustrating an abnormality detection circuit constituted by the connection structure body in FIG. 3.

DESCRIPTION OF EMBODIMENTS

Hereinafter, an embodiment of the will be described in detail with reference to drawings.

Figure 1:
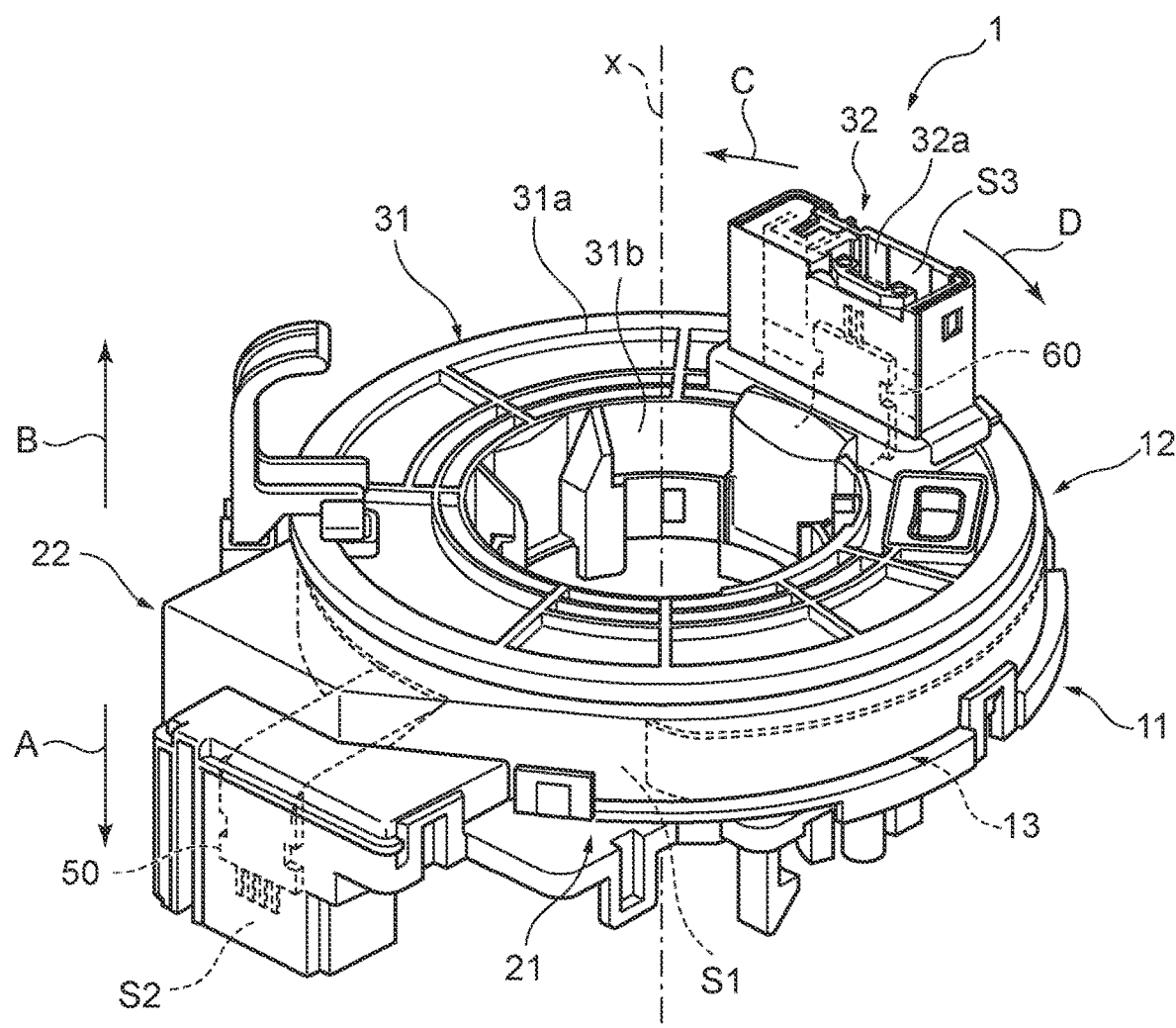
FIG. 1 is a perspective view schematically illustrating a rotary connector device including a connection structure body according to an embodiment of the disclosure.

FIG. 1 is a perspective view schematically illustrating a rotary connector device according to the present embodiment. The rotary connector device of FIG. 1 is represented as one example, and the configuration of the rotary connector device according to the disclosure is not limited to one in FIG. 1.

In FIG. 1, a rotary connector device 1 includes a stator 11, a rotator 12 that is rotatably attached to the stator 11, and a flexible flat cable group 13 (hereinafter referred to as "FFC group") that is housed in windable and unwindable manners in an annular space S1 around an axis line x formed between the stator 11 and the rotator 12. In a vehicle, the stator 11 is mounted on a vehicle body of the vehicle, and the rotator 12 is attached to a steering wheel.

The stator 11 includes a stator main body 21 that includes a circular engagement hole (not illustrated) centered on the axis line x and has an annular or substantially annular shape centered on the axis line x, and a stator side connector housing portion 22 that forms a stator side connector housing space S2.

The engagement hole formed in the stator main body 21 is formed to house an end portion on the lower side (the direction of an arrow A in FIG. 1) of a later-described cylindrical portion 31$b$ of the rotator 12 and be engageable with this end portion. The rotator 12 is rotatably engaged with the engagement hole of the stator main body 21 of the stator 11 at the end portion on the lower side of the cylindrical portion 31$b$, thereby being rotatably held by the stator 11.

The rotator 12 includes an annular rotator main body 31 provided around the axis line x (the direction of an arrow C and the direction of an arrow D in FIG. 1) and a rotator side connector housing portion 32 that makes the annular space S1 and the outside communicate with each other, and defines a rotator side connector housing space S3.

The rotator main body 31 includes a hollow disc-shaped or substantially hollow disc-shaped top plate portion 31$a$ centered on the axis line x, and a cylindrical portion 31$b$ that extends from the end portion on the inner peripheral side of the top plate portion 31$a$ to the annular space S1 along the axis line x. The top plate portion 31$a$ defines a portion facing the upper side (the direction of an arrow B in FIG. 1) in the rotary connector device 1. The cylindrical portion 31$b$ is formed to be rotatably engaged with a portion corresponding thereto in the stator 11 with respect to the axis line x.

As described above, with the rotator 12 being attached to the stator 11, the annular space S1 is defined by the top plate portion 31a and the cylindrical portion 31b of the rotator 12 as well as the stator main body 21 of the stator 11.

In the inside of the annular space S1, the FFC group 13 composed of the plurality of FFCs is wound to have a slack of an appropriate length, and the length of the slack changes in response to the rotation of rotator 12 relative to the stator 11. Each FFC of the FFC group 13 can be held in a state of being aligned invariably in the annular space S1 to follow the change in the length of the slack.

The end portion of the FFC group 13 drawn out from the annular space S1 is inserted into the stator side connector housing space S2 of the stator side connector housing portion 22. In addition, a fixation side terminal insertion hole (not illustrated) in which a predetermined shaped terminal connected to a wire harness that constitutes the electric circuit on a vehicle side can be inserted, is formed in the stator side connector housing portion 22. This terminal and the conductor portion of the FFC group 13 are connected by a stator side primary molding body 50 (another connection tool) arranged in the stator side connector housing space S2 of the stator side connector housing portion 22.

Similar to the stator side connector housing space S2, the end portion of the FFC group 13 drawn out from the annular space S1 is inserted into the rotator side connector housing space S3 of the rotator side connector housing portion 32. In addition, a rotation side terminal insertion hole 32a, into which the terminal of a cable drawn out from an electrical component (e.g., a horn switch, and an air bag module) included in the steering wheel can be inserted, is formed in the rotator side connector housing portion 32. This terminal and the conductor portion of the FFC 13 are connected by a rotator side primary molding body 60 (connection tool) in a molding holder (not illustrated) arranged in the rotator side connector housing space S3 of the rotator side connector housing portion 32.

With the aforementioned configuration, the electrical component such as the air bag module on the steering wheel side and the electric circuit on the vehicle side are electrically connected via the stator side primary molding body 50, the FFC group 13, and the rotator side primary molding body 60.

Figure 2:
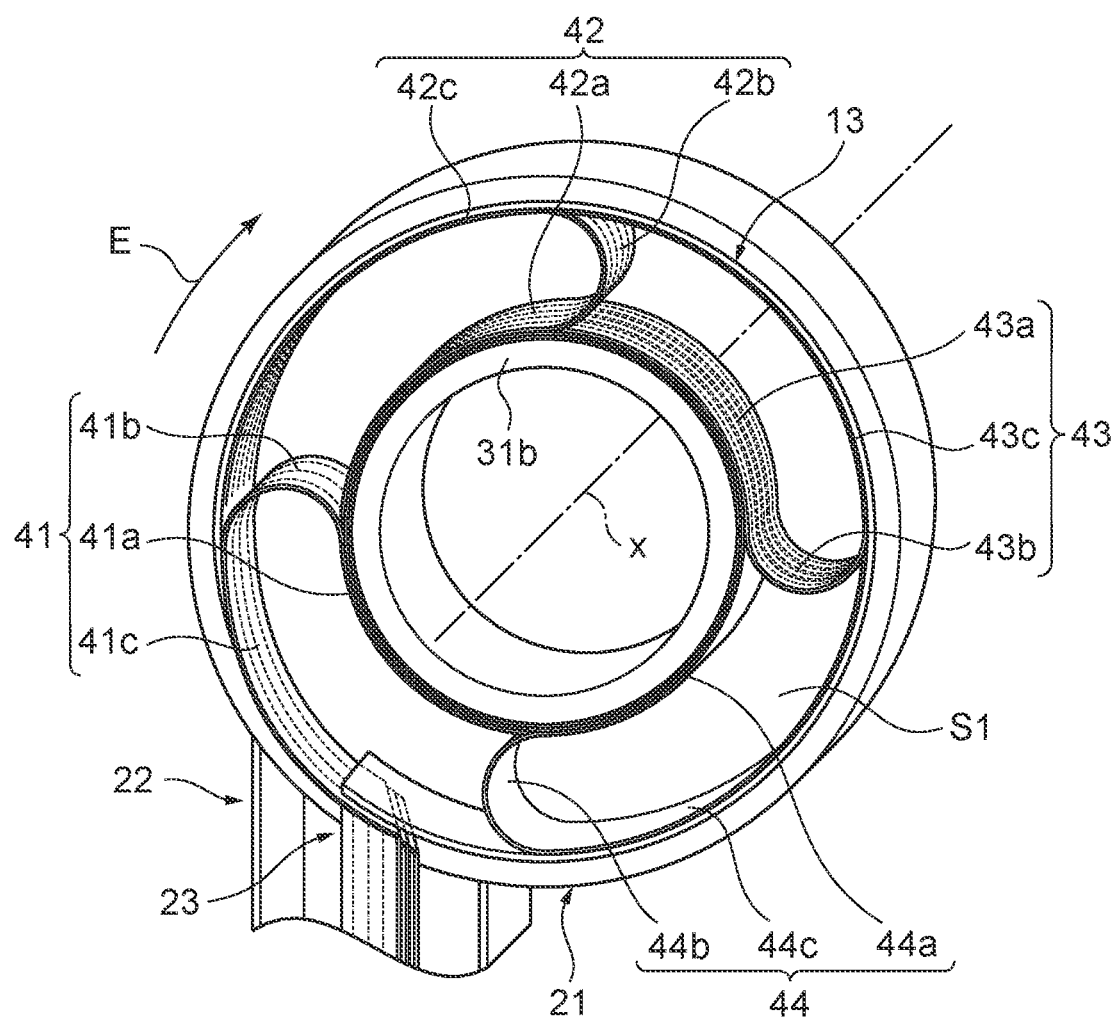
FIG. 2 is a perspective view illustrating the arrangement of a flexible flat cable group housed in an annular space in FIG. 1.

FIG. 2 is a perspective view illustrating the arrangement of the FFC group 13 housed in the annular space S1 in FIG. 1.

As illustrated in FIG. 2, the FFC group 13 includes a first FFC 41 wound on an inner peripheral side of the annular space S1, a second FFC 42 that is wound on an outer peripheral side of the first FFC 41 and that is longer in length than the first FFC 41 in the annular space S1, a third FFC 43 that is wound on the outer peripheral side of the second FFC 42 and that is longer in length than the second FFC 42 in the annular space S1, and a dummy cable 44 that is wound on the outer peripheral side of the third FFC 43 and that is longer in length than the third FFC 43 in the annular space S1. In the present embodiment, four cables are arranged in a rotationally symmetric manner at a substantially 90 degrees in the annular space S1. The first FFC 41 is the shortest among the four cables, and subsequently the second FFC 42, the third FFC 43, and the dummy cable 44 are configured to be shorter in length in this order. In addition, the second FFC 42 is arranged between the first FFC 41 and the third FFC 43 in a section in which the first FFC 41 to the third FFC 43 overlap, and three FFCs—the first FFC 41 to the third FFC 43 arranged in this order—are drawn from the annular space S1 to the stator side connector housing space S2 of the stator side connector housing portion 22 via a communication portion 23. The communication portion 23 is, for example, a notch formed on the outer peripheral portion of the stator main body 21 and provided between the annular space S1 and the stator side connector housing space S2.

The first FFC 41 includes, in the annular space S1, an inner periphery portion 41a wound around the cylindrical portion 31b of the rotator 12 one or plural times, a folding back portion 41b that is bent and folded back in an intermediate portion of the first FFC 41 in a longitudinal direction, and an outer peripheral portion 41c arranged opposite to a part of the inner peripheral portion 41a by the foldback on the folding back portion 41b. When the rotator 12 rotates clockwise or counterclockwise, the first FFC 41 is wound or unwound in a state where bending is maintained by the folding back portion 41b.

Similar to the first FFC 41, the second FFC 42 includes, in the annular space S1, an inner peripheral portion 42a wound around the cylindrical portion 31b of the rotator 12 one or plural times, a folding back portion 42b that is bent and folded back in an intermediate portion of the second FFC 42 in a longitudinal direction, and an outer peripheral portion 42c arranged opposite to a part of the inner peripheral portion 42a by the foldback on the folding back portion 42b. When the rotator 12 rotates clockwise or counterclockwise, the second FFC 42 is wound or unwound in a state where bending is maintained by the folding back portion 42b.

Similar to the first FFC 41, the third FFC 43 also includes, in the annular space S1, an inner peripheral portion 43a wound around the cylindrical portion 31b of the rotator 12 one or plural times, a folding back portion 43b that is bent and folded back in an intermediate portion of the third FFC 43 in a longitudinal direction, and an outer peripheral portion 43c arranged opposite to a part of the inner peripheral portion 43a by the foldback on the folding back portion 43b. When the rotator 12 rotates clockwise or counterclockwise, the third FFC 43 is wound or unwound in a state where bending is maintained by the folding back portion 43b.

In addition, similar to the first FFC 41, the dummy cable 44 also includes, in the annular space S1, an inner peripheral portion 44a wound around the cylindrical portion 31b of the rotator 12 one or plural times, a folding back portion 44b that is bent and folded back in an intermediate portion of the dummy cable 44 in a longitudinal direction, and an outer peripheral portion 44c arranged opposite to a part of the inner peripheral portion 44a by the foldback on the folding back portion 44b. When the rotator 12 rotates clockwise or counterclockwise, the dummy cable 44 is wound or unwound in a state where bending is maintained by the folding back portion 44b.

The first FFC 41, the second FFC 42, and the third FFC 43 respectively include a plurality of conductors, and the conductors respectively constitute electric circuits of various devices. The dummy cable 44 is formed of a flexible, elongated thin plate member that does not include a conductor and provided to maintain a state of alignment of the first FFC 41, the second FFC 42, and the third FFC 43. This elongated thin plate member is formed, for example, of resin such as plastic.

The length of the FFC in the longitudinal direction means a length from a welding portion of the stator side primary molding body 50, arranged in the stator side connector housing space S2, to a welding portion of the rotator side primary molding body 60 arranged in the rotator side connector housing space S3, and respective lengths of the first FFC 41 to the third FFC 43 between the welding portions are different from one another. In addition, the length of the FFC in the longitudinal direction in the annular space S1 substantially corresponds to the extra length of the FFC in the annular space S1, and the extra length of the FFC in the annular space S1 corresponds to the total length of the folding back portion and the outer peripheral portion of the FFC in the annular space S1. In the present embodiment, when the annular space S1 is viewed clockwise from the rotator 12 side to the stator 11 side (the direction of an arrow E in FIG. 2), a distance from a position, at which the communication portion is arranged, to a position, at which the folding back portion is arranged, corresponds to the length of the outer peripheral portion, and the total length of the folding back portion and the outer peripheral portion of the FFC is shorter in the order of the first FFC 41, the second FFC 42, and the third FFC 43 when substantially constant bend radius and substantially equal length of the folding back portion are assumed. Thus, the extra lengths of the FFCs in the annular space S1 are shorter in the order of the first FFC 41, the second FFC 42, and the third FFC 43, and the lengths of three FFCs in the longitudinal direction in the annular space S1 are shorter in this order. In other words, the length of three FFC 41 in the annular space S1 is shorter than any of the lengths of the second FFC 42 and the third FFC 43 in the annular space S1. The first FFC 41 having the shortest length in the longitudinal direction in the annular space S1 out of the first FFC 41 to the third FFC 43, the stator side primary molding body 50, and the rotator side primary molding body 60 constitute a connection structure body described later.

Figure 3:
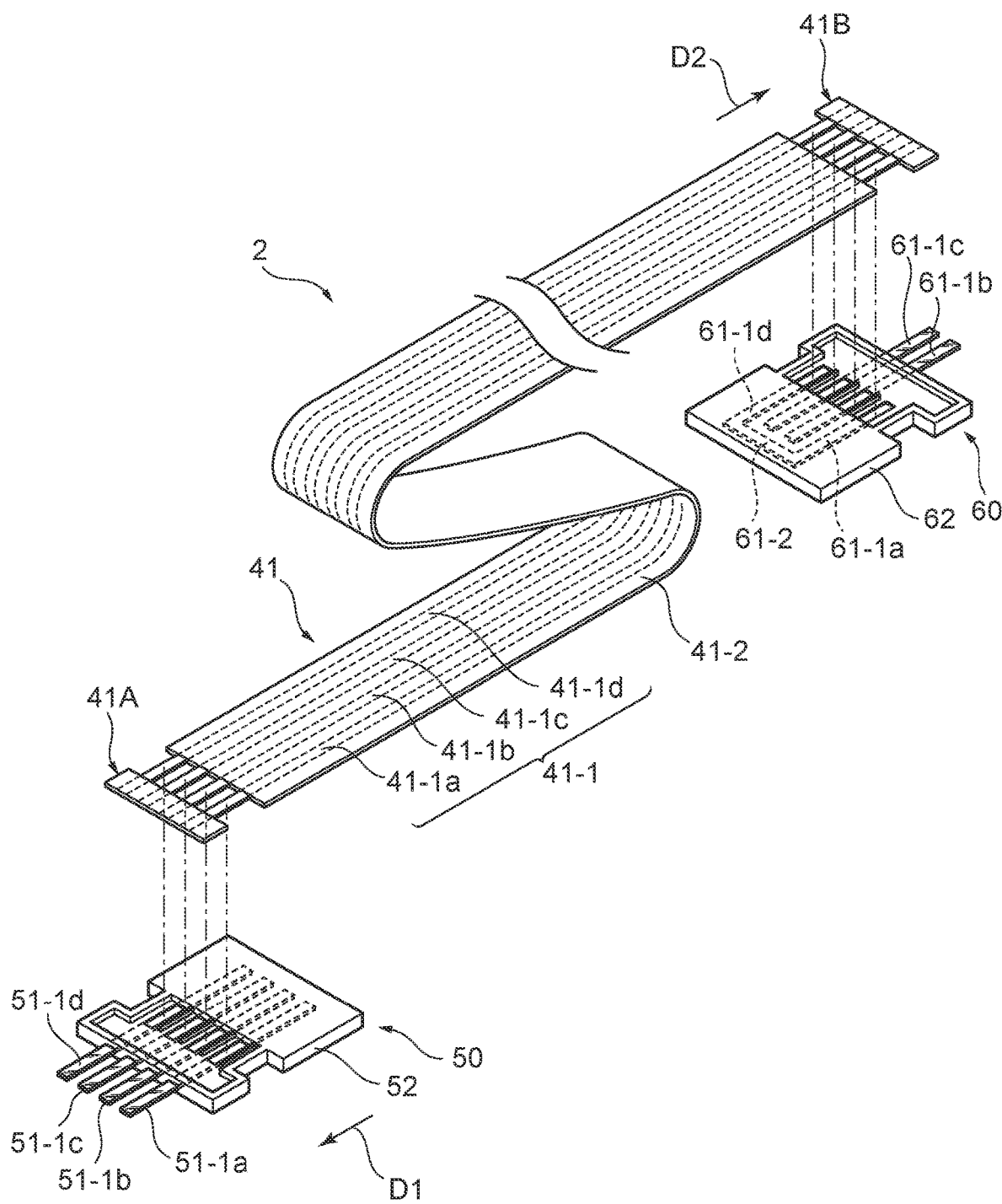
FIG. 3 is a perspective view illustrating the configuration of the connection structure body included in the rotary connector device in FIG. 1.

FIG. 3 is a perspective view illustrating the configuration of the connection structure body provided in the rotary connector device 1 in FIG. 1. As illustrated in the aforementioned drawing, a connection structure body 2 includes the first FFC 41, the stator side primary molding body 50, and the rotator side primary molding body 60 which are attached to both end portions 41A and 41B of the first FFC 41 respectively and can make an electrical connection between the first FFC 41 and the outside. The stator side primary molding body 50 is housed in the stator 11 and provided to be connectable with an electric circuit on a main body side D1 of the vehicle, and the rotator side primary molding body 60 is housed in the rotator 12 and provided to be connectable with an electric circuit on a steering wheel side D2 of the vehicle.

The first FFC 41 includes a conductor group 41-1 composed of conductors 41-1a, 41-1b, 41-1c, and 41-1d, and two insulating films 41-2 arranged to sandwich the conductor group 41-1 via an adhesive layer (not illustrated). The conductors 41-1a to 41-1d are formed of, for example, a single layer made of copper or copper alloy or a multiple layer including a layer made of copper or copper alloy and a plating layer, and arranged side by side in such a manner that the in-plane directions of rolling faces are substantially identical. The conductors can be manufactured by slitting a rolled copper foil or rolling a rod-like member, and a rolled face in the manufacturing process (right face or back face) is the above-mentioned rolling face.

The conductors 41-1a and 41-1d are physical elements that are connected to an abnormality detection circuit for detecting an abnormality such as a break in the rotary connector device 1 and constitute the abnormality detection circuit. As described above, the extra length of the first FFC 41 is the shortest among three of the first FFC 41 to the third FFC 43. Thus, when the rotator 12 rotates due to steering, the first FFC 41 is prone to receive tension (external force) in the longitudinal direction, and is highly likely to have a failure such as a break. Consequently, the conductors 41-1a and 41-1d that constitute the abnormality detection circuit are disposed in the first FFC 41 in which a failure such as a break easily occurs. The conductors 41-1a and 41-1d, for example, have a width of 0.8 to 1 mm and a thickness of 0.02 to 0.05 mm.

The conductors 41-1b and 41-1c are physical elements that are connected to the air bag circuit and constitute the air bag circuit. The conductors 41-1b and 41-1c, for example, have a width of 1.5 mm to 2 mm and a thickness of 0.02 mm to 0.05 mm.

In the first FFC 41, the conductors 41-1a to 41-1d are arranged side by side, and the conductors 41-1a and 41-1d that constitute the abnormality detection circuit are positioned in the alignment direction at both ends of the conductors 41-1b and 41-1c that constitute the air bag circuit. Thus, the conductors 41-1a and 41-1d are positioned at the outermost portions in the width direction of the first FFC 41.

Figure 4A:
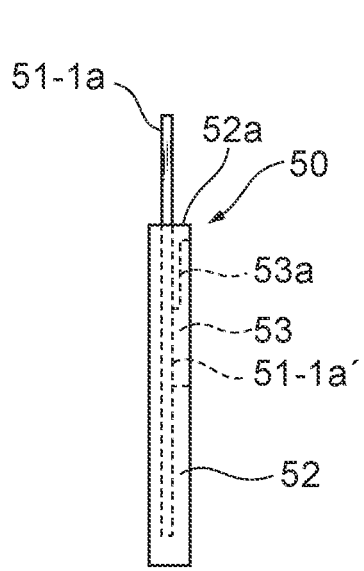
FIG. 4A is a side view of a stator side primary molding body.
Figure 4B:
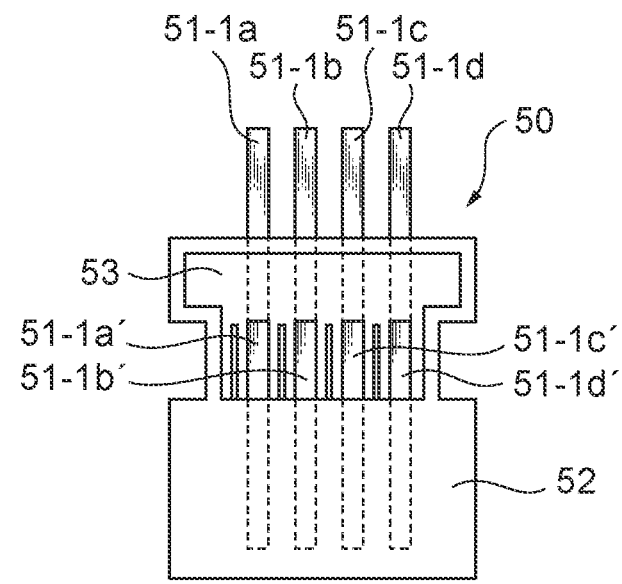
FIG. 4B is a plan view of FIG. 4A.

As illustrated in FIGS. 4A and 4B, the stator side primary molding body 50 includes a plurality of busbars 51-1a, 51-1b, 51-1c, and 51-1d (another plurality of busbars) and a busbar case 52 (second holding portion) for holding the busbars 51-1a to 51-1d in such a manner that the busbars 51-1a to 51-1d are partly exposed.

Each of the busbars 51-1a to 51-1d is an elongated metallic conductor, one end of which is buried in the busbar case 52 and the other end of which extends from a side face 52a of the busbar case 52.

The busbar case 52 includes a flat-shaped recessed portion 53, and terminal portions 51-1a' to 51-1d' are disposed on a bottom wall 53a of the recessed portion 53. The terminal portions 51-1a' to 51-1d' are aligned with the same alignment pitch as that of the conductors 41-1a to 41-1d of the first FFC 41.

Figure 4C:
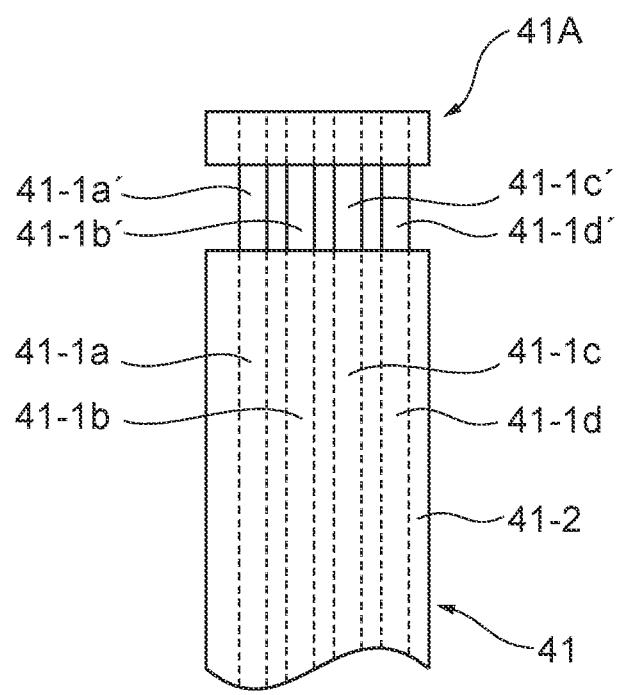
FIG. 4C is a plan view of one end of a flexible flat cable.

The busbars 51-1a to 51-1d are respectively electrically connected to the conductors 41-1a to 41-1d at the end portion 41A of the first FFC 41 (FIG. 3, FIG. 4C). Specifically, the terminal portions 51-1a', 51-1b', 51-1c', and 51-1d' that are formed by partly exposing the busbars 51-1a to 51-1d are connected one-to-one to conductor portions 41-1a', 41-1b', 41-1c', and 41-1d' that are formed by partly exposing the conductors 41-1a to 41-1d of the first FFC 41. Each terminal portion and each conductor portion described above are welded each other by ultrasonic welding, resistance welding, laser welding, or the like, thereby forming a welding portion (connection portion).

The busbars 51-1a and 51-1d are physical elements that are connected to the abnormality detection circuit for detecting an abnormality such as a break in the rotary connector device 1 and constitute the abnormality detection circuit. In addition, the busbars 51-1b and 51-1c are physical elements that are connected to the air bag circuit and constitute the air bag circuit.

Figure 5A:
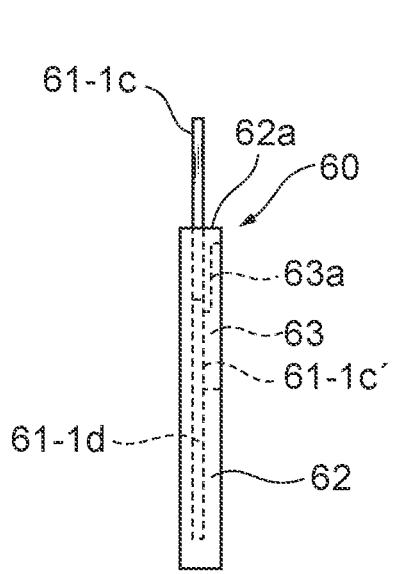
FIG. 5A is a side view of a rotator side primary molding body.
Figure 5B:
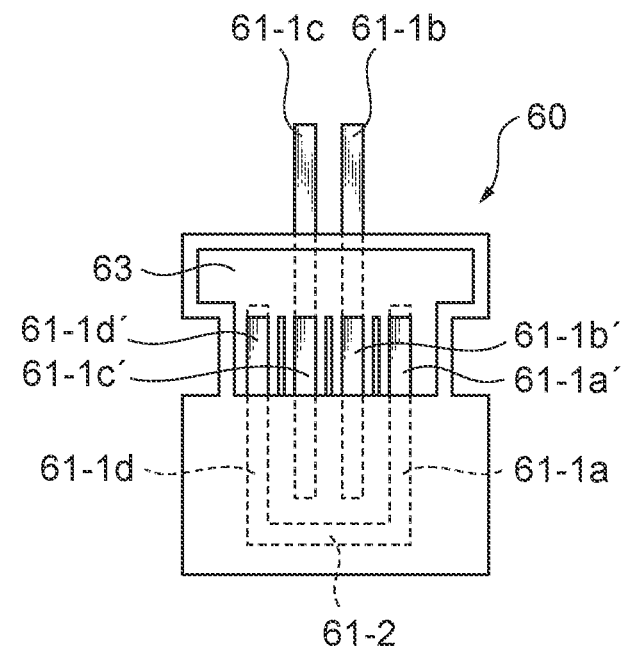
FIG. 5B is a plan view of FIG. 5B.

As illustrated in FIG. 5B, the rotator side primary molding body 60 includes busbars 61-1a, 61-1b, 61-1c, and 61-1d (a plurality of busbars) arranged in parallel to each other corresponding to the busbars 51-1a to 51-1d, a conductive portion 61-2 that electrically connects a pair of busbars 61-1a and 61-1d positioned on both ends of the busbars 61-1a to 61-1d respectively in the alignment direction, and a busbar case 62 (first holding portion) for holding the busbars 61-1a to 61-1d in such a manner that the busbars 61-1a to 61-1d are partly exposed.

Each of the busbars 61-1b and 61-1c is an elongated metallic conductor, one end of which is buried in the busbar case 62 and the other end of which extends from the side face 62a of the busbar case 62.

The pair of busbars 61-1a and 61-1d is an elongated metallic conductor, and the entirety of the pair of busbars 61-1a and 61-1d except for exposed parts is buried in the busbar case 62. In addition, the conductive portion 61-2 is an elongated metallic conductor, and the entirety of the conductive portion 61-2 is buried in the busbar case 62. In the present embodiment, the pair of busbars 61-1a and 61-1d and the conductive portion 61-2 constitute an integrally formed U-shaped or substantially U-shaped conductor.

The busbar case 62 is a member made of resin and molded to hold the busbars 61-1a and 61-1d. The busbar case 62 includes a flat-shaped recessed portion 63, and terminal portions 61-1a' to 61-1d' are disposed on the bottom wall 63a of the recessed portion 63. The terminal portions 61-1a' to 61-1d' are aligned with the same alignment pitch as that of the conductors 41-1a to 41-1d of the first FFC 41.

Figure 5C:
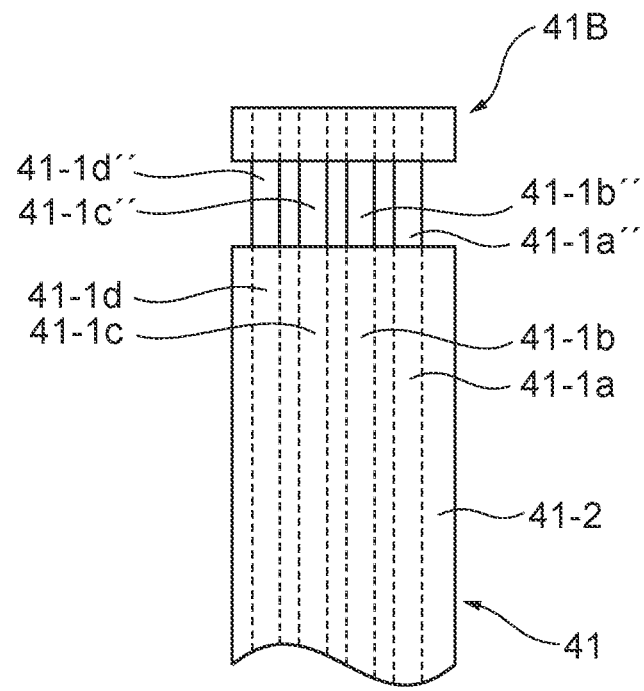
FIG. 5C is a plan view of the other end of the flexible flat cable.

The busbars 61-1a to 61-1d are electrically connected to the conductors 41-1a to 41-1d respectively at the end portion 41B of the FFC 41 (FIG. 3, FIG. 5C). Specifically, the terminal portions 61-1a', 61-1b', 61-1c', and 61-1d' that are formed by partly exposing the busbars 61-1a to 61-1d are connected one-to-one to conductor portions 41-1a", 41-1b", 41-1c", and 41-1d" that are formed by partly exposing the conductors 41-1a to 41-1d of the first FFC 41. Each terminal portion and each conductor portion described above are welded to each other by ultrasonic welding, resistance welding, laser welding, or the like, thereby forming a welding portion (connection portion).

The busbars 61-1a and 61-1d and the conductive portion 61-2 are connected to the abnormality detection circuit for detecting an abnormality such as a break in the rotary connector device 1 and constitute the abnormality detection circuit by forming partly a closed circuit described later. In addition, the busbars 61-1b and 61-1c are connected to the air bag circuit and constitute the air bag circuit.

Figure 6A:
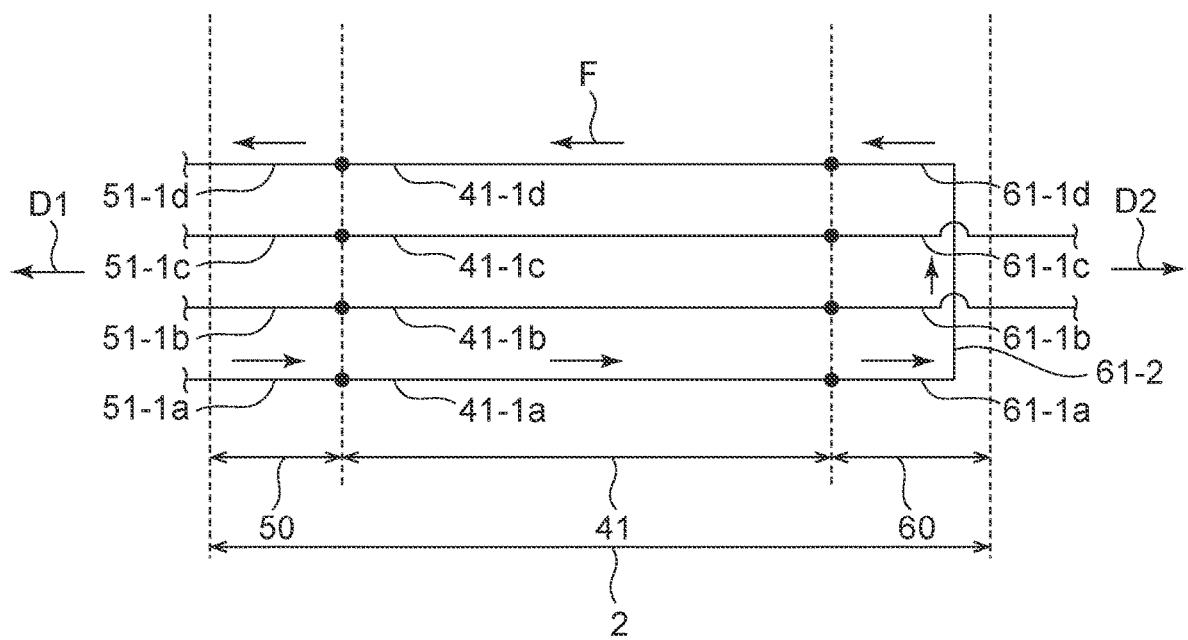
FIG. 6A illustrates a normal state.
Figure 6B:
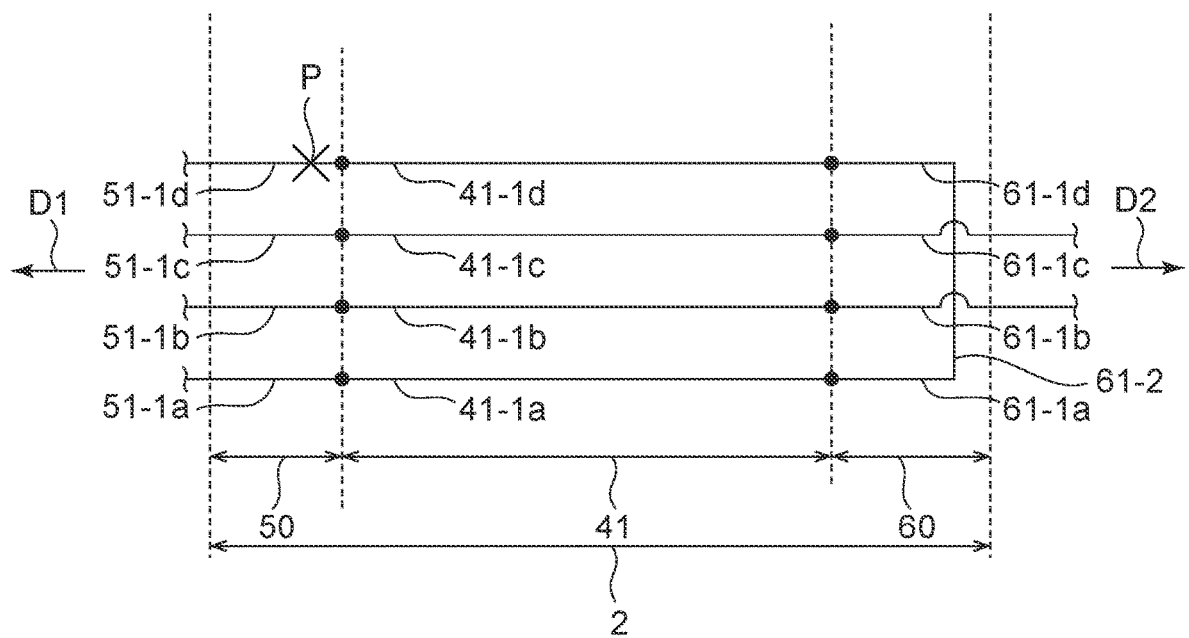
FIG. 6B illustrates a state when an abnormality occurs.

FIG. 6 is a view illustrating the abnormality detection circuit constituted by the connection structure body 2 in FIG. 3, and FIG. 6A illustrates a normal state, and FIG. 6B illustrates a state when an abnormality occurs.

In the connection structure body 2 with the configuration described above, the busbar 51-1b, the conductor 41-1b, and the busbar 61-1b are connected in this order to constitute a first air bag circuit (AB+), and the busbar 51-1c, the conductor 41-1c, and the busbar 61-1c are connected in this order to constitute a second air bag circuit (AB−). In addition, the busbar 51-1a, the conductor 41-1a, the busbar 61-1a, the conductive portion 61-2, the busbar 61-1d, the conductor 41-1d, and the busbar 51-1d are connected in this order to constitute the abnormality detection circuit that is a closed circuit.

When an abnormality such as a break in the connection structure body 2 is detected, the abnormality detection circuit is electrified from the vehicle side, that is, the busbars 51-1a and 51-1d side of the stator side primary molding body 50. Then, it is determined whether a current flowing in the abnormality detection circuit is equal to or higher than a prescribed value, and when the current at the time of electrification is equal to or higher than the prescribed value, it is determined that a short circuit (circuit fault) has occurred, and when the current at the time of electrification is less than the prescribed value, it is determined that an abnormality such as a break has occurred in the connection structure body 2.

When the abnormality detection circuit is normal (FIG. 6A), a current F flows from the stator side primary molding body 50 to the rotator side primary molding body 60 via the first FFC 41 and further flows from the rotator side primary molding body 60 to the stator side primary molding body 50 via the first FFC 41 by the conductive portion 61-2. In contrast, when an abnormality such as a break occurs at a point P in the abnormality detection circuit (FIG. 6B), a current flowing in the abnormality detection circuit begins to exhibit a value less than a prescribed current value due to an increase of a resistance value of the abnormality detection circuit, or a current cannot be measured due to the break. Thus, when a current in the abnormality detection circuit at the time of electrification exhibits a value less than the prescribed current value, or a current value cannot be measured, an abnormality such as a break that has occurred in the connection structure body 2 can be determined.

When excessive rotation occurs in the rotary connector device 1, a break is likely to occur in a connection portion between the stator side primary molding body 50 and the first FFC 41 or in the vicinity thereof on the main body side D1 of the vehicle. Further, at that time, an end portion (one end or both ends) of the first FFC 41 in the width direction is most likely to receive external force, and a break is likely to occur in a connection portion between the conductor 41-1a and the busbar 51-1a or in the vicinity thereof or in a connection portion between the conductor 41-1d and the busbar 51-1d or in the vicinity thereof at the end portion of the first FFC 41 in the width direction. Thus, in the rotator side primary molding body 60, the pair of busbars 61-1a and 61-1d positioned at both ends in the alignment direction out of the busbars 61-1a to 61-1d is connected by the conductive portion 61-2, and the busbar 61-1a is connected to the conductor 41-1a, and the busbar 61-1d is connected to the conductor 41-1d.

The electrification to the abnormality detection circuit can be performed by an external device except for devices mounted on the vehicle, for example, by connecting a tester, or by a control device mounted on the vehicle, for example, a Multiplex Integrated Control Unit (MICU). In addition, the control device can determine whether a current flowing in the abnormality detection circuit exhibits a value equal to or higher than a prescribed current value. Thus, the rotary connector device 1 cannot detect a circuit abnormality singly, but by electrifying the abnormality detection circuit of the rotary connector device 1, a circuit abnormality can be detected on the basis of a current value at the time of electrification.

Further, the control device mounted on the vehicle may sequentially or always perform the electrification and the determination, and may monitor the connection structure body 2. In addition, when the control device performs the electrification and the determination, a driver may be warned of an abnormality of the connection structure body 2 by image display or sound, using a display device, an acoustic device or the like equipped in the vehicle.

As described above, according to the present embodiment, the connection structure body 2 includes the first FFC 41, the stator side primary molding body 50, and the rotator side primary molding body 60 which are attached to both end portions 41A and 41B of the first FFC 41 respectively and can make an electrical connection between the first FFC 41 and the outside. The rotator side primary molding body 60 includes the busbars 61-1a to 61-1d arranged in parallel to each other corresponding to the busbars 51-1a to 51-1d of the stator side primary molding body 50, the conductive portion 61-2 that electrically connects the pair of busbars 61-1a and 61-1d positioned on both ends of the busbars 61-1a to 61-1d respectively in the alignment direction, and the busbar case 62 for holding the busbars 61-1*a* to 61-1*d* such that the busbars 61-1*a* to 61-1*d* are partly exposed. Then, the busbars 61-1*a* and 61-1*d* and the conductive portion 61-2 constitute the abnormality detection circuit by partly forming the closed circuit. In this way, the busbars 51-1*a* and 51-1*d* of the stator side primary molding body 50, the conductors 41-1*a* and 41-1*d* of the first FFC 41, the busbars 61-1*a* and 61-1*d* and the conductive portion 61-2 of the rotator side primary molding body 60 constitute the abnormality detection circuit that is a closed circuit, whereby in a case where an abnormality occurs, that is, when a break occurs in the first FFC 41 due to excessive rotation, or when a break occurs in the connection portion between the first FFC 41 and the stator side primary molding body 50, break detection can be performed with ease and high accuracy, achieving high connection reliability and safety.

In addition, the rotator side primary molding body 60 includes the busbars 61-1*b* and 61-1*c* arranged in parallel between the pair of busbars 61-1*a* and 61-1*d*, and the busbars 61-1*b* and 61-1*c* constitute the air bag circuit. In this way, the air bag circuit is provided in the center portion in the alignment direction of the circuit in the connection structure body 2, and the abnormality detection circuits are provided on both ends of the center portion, whereby the abnormality detection circuits can be arranged on both ends in the width direction of the first FFC 41 where a break is likely to occur. Consequently, abnormality detection is made possible by the abnormality detection circuits before a break or the like occurs in the air bag circuit, and abnormality detection at an early stage can be achieved, and an abnormality can be detected more reliably in a state where the vehicle is safe than the conventional art.

In addition, the stator side primary molding body 50 is housed in the stator 11 and provided to be connectable with the electric circuit on the main body side D1 of the vehicle, and the rotator side primary molding body 60 is housed in the rotator 12 and provided to be connectable with the electric circuit on the steering wheel side D2 of the vehicle. In this case, the conductive portion 61-2 is provided in the rotator side primary molding body 60 housed in the rotator 12, hence, the occurrence of an abnormality that arises in the stator side primary molding body 50, the first FFC 41, the rotator side primary molding body 60, or a connection portion between each molding body and the first FFC 41 or the vicinity thereof on the main body side D1 of the vehicle can be easily detected by electrifying the busbars 51-1*a* and 51-1*d* of the stator side primary molding body 50.

In addition, the rotary connector device 1 further includes, in the annular space S1, the second FFC 42 and the third FFC 43 that are wound on the outer peripheral side of the first FFC 41, and since the length of the first FFC 41 which constitutes the connection structure body 2 in the annular space S1 is shorter than any of the lengths of the second FFC 42 and the third FFC 43 in the annular space S1, an abnormality that occurs in the rotary connector device 1 can be detected with high accuracy by providing the abnormality detection circuits in the first FFC 41 where an abnormality such as a break is likely to occur, and moreover abnormality can be detected before an abnormality occurs in the circuits of the second FFC 42 and the third FFC 43, and high connection reliability and safety of the rotary connector device 1 can be achieved.

In addition, in the manufacture and repair processes of the vehicle, when the rotary connector device 1 is mounted on a vehicle, it is possible to use the abnormality detection circuits as circuits dedicated to inspection, detect an abnormality such as a break that is caused by excessive rotation attributed to assembly errors or the like, and warn an operator when abnormality occurs. This allows detection and verification of abnormality in the rotary connector device 1 in an automobile manufacturing plant, a maintenance workshop, or a car dealer.

Further, the abnormality detection circuits are configured to be connected to the control device of the vehicle and warn a driver of the occurrence of abnormality in the vehicle, which allows the driver to recognize the occurrence of abnormality such as a break in the rotary connector device 1 or the like during the driving of the vehicle. Thus, it is possible to prompt the driver to seek repair before a break in the air bag circuit or the horn circuit occurs, and a failure which may lead to inability to travel can be avoided in advance.

In addition, in the control device of the vehicle, the timing of the occurrence of abnormality can be recognized and determined during inspection by recording results of monitoring abnormality detection using the abnormality detection circuits, and the tendency of the occurrence of abnormality can be easily analogized during analysis of a defective product.

Hereinbefore, the rotary connector device according to the present embodiments has been described, but the disclosure is not limited to the above embodiments, and various modifications and changes are possible on the basis of the technical concept of the disclosure.

For example, in the present embodiment, the connection structure body 2 includes the first FFC 41, the stator side primary molding body 50, and the rotator side primary molding body 60, which are attached to both end portions 41A and 41B of the first FFC respectively, and which can make an electrical connection between the first FFC 41 and the outside, but the configuration is not limited to this. The configuration in which the stator side primary molding body 50 is not provided on the end portion 41A (the other end portion) of the first FFC 41 may be employed. That is, the connection structure body 2 may include the first FFC 41 and the rotator side primary molding body 60 (connection tool) which is attached to the end portion 41B (one end portion) of the first FFC 41, and can make an electrical connection between the first FFC 41 and the outside. In this case, the end portion 41A of the first FFC 41 is electrically connected directly or via another member to the outside. The configuration of the rotator side primary molding body 60 is similar to that of the aforementioned embodiment, and the description thereof will be omitted.

With this configuration, the conductors 41-1*a* and 41-1*d* of the first FFC 41, the busbars 61-1*a* and 61-1*d* and the conductive portion 61-2 of the rotator side primary molding body 60 constitute the abnormality detection circuit that is a closed circuit, hence, in a case where abnormality occurs, that is, when a break occurs in the first FFC 41 due to excessive rotation, break detection can be performed with ease and high accuracy, and high connection reliability and safety can be achieved.

In addition, preferably, the rotator side primary molding body 60 is housed in the rotator 12 and provided to be connectable with the electric circuit on the steering wheel side D2 of the vehicle. In this case, the conductive portion 61-2 is provided in the rotator side primary molding body 60 housed in the rotator 12, hence, the occurrence of abnormality that arises in the first FFC 41, the rotator side primary molding body 60, or a connection portion between the rotator side primary molding body 60 and the first FFC 41 or the vicinity thereof on the main body side D1 of the vehicle can be easily detected.

In addition, the stator side primary molding body 50 and the rotator side primary molding body 60 have a substantially flat rectangular parallelepiped shape, but the shape is not limited to this and may have another shape having a cross section formed in an L-shape or the like. In addition, the busbars of respective primary molding bodies may have another shape formed in an L-shape or the like.

In addition, in the rotator side primary molding body 60, the pair of the busbars 61-1a and 61-1d and the conductive portion 61-2 constitute an integrally formed U-shaped conductor, but the shape is not limited to this and may have another shape capable of electrically connecting the conductors 41-1a and 41-1d of the first FFC 41. In addition, the conductive portion 61-2 is an elongated metallic conductor, but is not limited to this and may be a member formed in another shape and formed of a material allowing electrical connection with the pair of the busbars 61-1a and 61-1d.

Further, the entirety of the conductive portion 61-2 is buried in the busbar case 62, but the configuration is not limited to this, and the entirety of the conductive portion 61-2 may be exposed. When the conductive portion 61-2 is configured to be exposed, by using the conductive portion 61-2 as a contact point at the time of abnormality detection determination and implementing electrification by connecting another component or another circuit, it is possible to detect the occurrence of abnormality such as a break on the upstream side or the downstream side of the conductive portion 61-2 and achieve abnormality detection with higher accuracy. In addition, the conductive portion 61-2 can be used as a contact point for verifying the electrification using apparatuses such as a tester.

In addition, in the present embodiment, the two busbars 51-1b (AB+) and 51-1c (AB−) of the stator side primary molding body 50 and the two busbars 61-1b (AB+) and 61-1c (AB−) of the rotator side primary molding body 60 form one path of the air bag circuit, but the configuration is not limited to this. For example, the stator side primary molding body 50 and the rotator side primary molding body 60 may respectively include four busbars that constitute an ignition output dual circuit of a two-stage gas generator (dual inflator). In this case, two busbars out of the four busbars are connected to one inflator provided in the air bag, and the remaining two busbars are connected to the other inflator provided in the aforementioned air bag. In addition, the stator side primary molding body 50 and the rotator side primary molding body 60 may respectively include three busbars that constitute an ignition output dual circuit of a two-stage gas generator (dual inflator). In this case, one busbar (AB−) for common use out of the three busbars is connected to one inflator, and the remaining two busbars (AB+, AB+) are connected to the other inflator. As thus described, the connection structure body 2 can be adopted not only for one ignition output circuit but also for two ignition output dual circuits or three ignition output circuits or more.

In addition, in a case where the connection structure body is adopted for one ignition output circuit or two ignition output circuits or more, a backup redundancy circuit may be formed by providing an auxiliary FFC for backup redundancy and providing another plurality of busbars corresponding thereto in each of the stator side primary molding body and the rotator side primary molding body.

In addition, in the stator side primary molding body 50 and the rotator side primary molding body 60, the number of busbars except for the busbars that constitute the abnormality detection circuit is not limited to those in the present embodiment, but may be changed to another number in accordance with use and specifications.

For example, the stator side primary molding body 50 includes the busbars 51-1b and 51-1c that constitute the air bag circuit, but may include one busbar that constitutes the horn circuit, instead of the air bag circuit. Similarly, the rotator side primary molding body 60 includes the busbars 61-1b and 61-1c that constitute the air bag circuit, but may include one busbar that constitutes the horn circuit, instead of the air bag circuit. In addition, the at least one electric circuit may serve as both the horn circuit and the air bag circuit.

In addition, the stator side primary molding body 50 and the rotator side primary molding body 60 each may include at least one busbar except for the busbars that constitute the abnormality detection circuit, and the at least one busbar may constitute at least one electric circuit.

For example, the at least one electric circuit may include one of or both of the horn circuit and the air bag circuit and include an electric circuit except for the horn circuit and the air bag circuit. In addition, the at least one electric circuit may be an electric circuit except for the horn circuit and the air bag circuit.

In addition, one first FFC 41 is connected to one stator side primary molding body 50, but the configuration is not limited to this, and a plurality of FFCs may be connected to one stator side primary molding body 50. In this case, a plurality of busbars corresponding to the total number of conductors provided in the plurality of FFCs are provided in the stator side primary molding body 50. In addition, similarly, a plurality of FFCs may be connected to one rotator side primary molding body 60.

In addition, as for the first FFC 41, the width of the conductors that constitute the air bag circuit may be wider than the width of the conductors that constitute the abnormality detection circuit.

In addition, as for the first FFC 41, the number of conductors except for the conductors that constitute the abnormality detection circuit is not limited to the present embodiment, but may be changed to another number in accordance with use and specifications. For example, the first FFC 41 includes the two conductors 41-1b and 41-1c that constitute the air bag circuit, but the configuration is not limited to this, and may include one conductor that constitutes the horn circuit. In addition, the first FFC 41 may further include another conductor that constitutes another circuit, besides the conductors that constitute the abnormality detection circuit, the air bag circuit, and the horn circuit.

In addition, when the first FFC 41 includes one conductor that constitutes the horn circuit and two conductors that constitute the abnormality detection circuit, the second FFC 42 may include one conductor that constitutes the horn circuit as a backup redundancy circuit and at least two conductors that constitute the air bag circuit. As such, by providing the abnormality detection circuit in the first FFC 41, where an abnormality is likely to occur, out of the first FFC 41 to the third FFC 43, the abnormality can be detected at an early stage.

In addition, the rotary connector device 1 includes the dummy cable 44, but the configuration is not limited to this, and may include an auxiliary FFC for backup redundancy for any of the first to third FFCs, in place of the dummy cable 44. In addition, the rotary connector device 1 may include in place of the dummy cable 44 a fourth FFC including a conductor that constitutes another electric circuit.

For example, the third FFC 43 may include, for example, conductors that constitute a high current circuit through which a higher current flows than through the air bag circuit. In addition, the third FFC 43 may further include another conductor that constitutes another electric circuit besides the conductors that constitute the high current circuit.

In addition, in the embodiment, the FFC group 13 includes three FFCs, but the configuration is not limited to this, and may include two FFCs or four FFCs or more. In addition, the rotary connector device 1 may include one FFC in place of the FFC group 13.

Further, the configuration except for the FFC group of the rotary connector device 1 is not limited to the embodiment, and may include another shape and structure.

REFERENCE SIGNS LIST

1 Rotary connector device
2 Connection structure body
11 Stator
12 Rotator
13 Flexible flat cable group (FFC group)
21 Stator main body
22 Stator side connector housing portion
23 Communication portion
31 Rotator main body
31*a* Top plate portion
31*b* Cylindrical portion
32 Rotator side connector housing portion
32*a* Rotation side terminal insertion hole
41 First FFC
41*a* Inner peripheral portion
41*b* Folding back portion
41*c* Outer peripheral portion
41-1 Conductor group
41-1*a*, 41-1*b*, 41-1*c*, 41-1*d* Conductor
41-1*a'*, 41-1*b'*, 41-1*c'*, 41-1*d'* Conductor portion
41-1*a''*, 41-1*b''*, 41-1*c''*, 41-1*d''* Conductor portion
41-2 Insulating film
42 Second FFC
42*a* Inner peripheral portion
42*b* Folding back portion
42*c* Outer peripheral portion
43 Third FFC
43*a* Inner peripheral portion
43*b* Folding back portion
43*c* Outer peripheral portion
44 Dummy cable
44*a* Inner peripheral portion
44*b* Folding back portion
44*c* Outer peripheral portion
50 Stator side primary molding body
51-1*a*, 51-1*b*, 51-1*c*, 51-1*d* Busbar
51-1*a'*, 51-1*b'*, 51-1*c'*, 51-1*d'* Terminal portion
52 Busbar case
52*a* Side face
53 Recessed portion
53*a* Bottom wall
60 Rotator side primary molding body
61-1*a*, 61-1*b*, 61-1*c*, 61-1*d* Busbar
61-1*a'*, 61-1*b'*, 61-1*c'*, 61-1*d'* Terminal portion
62 Busbar case
62*a* Side face
63 Recessed portion
63*a* Bottom wall
D1 Main body side of vehicle
D2 Steering wheel side
F Current
S1 Annular space
S2 Stator side connector housing space
S3 Rotator side connector housing space
x Axis line

The invention claimed is:

1. A connection structure body including a flexible flat cable housed in windable and unwindable manners in an annular space and a connection tool that is attached to one end of the flexible flat cable and is able to make an electrical connection between the flexible flat cable and outside, wherein
the connection tool includes:
a plurality of busbars arranged in parallel to each other;
a conductive portion configured to electrically connect a pair of busbars positioned on both ends respectively in an alignment direction of the plurality of busbars; and
a first holding portion configured to hold the plurality of busbars in such a manner that the plurality of busbars are partly exposed, and
the pair of busbars and the conductive portion form a part of a closed circuit, thereby constituting an abnormality detection circuit, wherein
the connection structure body further comprises at least another flexible flat cable wound on an outer peripheral side of the flexible flat cable in the annular space, wherein
a length of the flexible flat cable that constitutes the connection structure body in the annular space is shorter than any length of the at least another flexible flat cable in the annular space.

2. The connection structure body according to claim 1, further comprising another connection tool that is attached to the other end portion of the flexible flat cable and is able to make an electrical connection between the flexible flat cable and the outside, wherein the other connection tool includes:
another plurality of busbars arranged in parallel to each other corresponding to the plurality of busbars; and
a second holding portion configured to hold the other plurality of busbars in such a manner that the other plurality of busbars are partly exposed.

3. The connection structure body according to claim 1, wherein
the connection tool includes at least one busbar arranged in parallel between the pair of busbars, and
the at least one busbar constitutes at least one electric circuit.

4. The connection structure body according to claim 3, wherein
the at least one electric circuit includes one of or both of a horn circuit and an air bag circuit.

5. A rotary connector device including a stator and a rotator rotatably attached to the stator,
the rotary connector device comprising a connection structure body including a flexible flat cable housed in windable and unwindable manners in an annular space between the stator and the rotator, and a connection tool that is attached to one end of the flexible flat cable and is able to make an electrical connection between the flexible flat cable and outside, wherein
the connection tool includes:
a plurality of busbars arranged in parallel to each other;
a conductive portion configured to electrically connect a pair of busbars positioned on both ends respectively in an alignment direction of the plurality of busbars; and a first holding portion configured to hold the plurality of busbars in such a manner that the plurality of busbars are partly exposed, wherein the pair of busbars and the conductive portion form a part of a closed circuit, thereby constituting an abnormality detection circuit, wherein the stator is attached to a vehicle body of a vehicle, and the rotator is attached to a steering wheel of the vehicle, and wherein the connection tool is housed in the rotator and provided to be connectable with an electric circuit on a steering wheel side of the vehicle.

6. The rotary connector device according to claim 5, further comprising another connection tool that is attached to the other end of the flexible flat cable and is able to make an electrical connection between the flexible flat cable and the outside, wherein the other connection tool includes:

another plurality of busbars arranged in parallel to each other corresponding to the plurality of busbars; and a second holding portion configured to hold the other plurality of busbars in such a manner that the other plurality of busbars are partly exposed.

7. A rotary connector device including a stator and a rotator rotatably attached to the stator, the rotary connector device comprising a connection structure body including a flexible flat cable housed in windable and unwindable manners in an annular space between the stator and the rotator, a connection tool that is attached to one end of the flexible flat cable and is able to make an electrical connection between the flexible flat cable and outside, and another connection tool that is attached to the other end of the flexible flat cable and is able to make an electrical connection between the flexible flat cable and the outside, wherein the connection tool includes:

a plurality of busbars arranged in parallel to each other;

a conductive portion configured to electrically connect a pair of busbars positioned on both ends respectively in an alignment direction of the plurality of busbars; and a first holding portion configured to hold the plurality of busbars in such a manner that the plurality of busbars are partly exposed, wherein the pair of busbars and the conductive portion form a part of a closed circuit, thereby constituting an abnormality detection circuit, wherein the other connection tool includes:

another plurality of busbars arranged in parallel to each other corresponding to the plurality of busbars; and a second holding portion configured to hold the other plurality of busbars in such a manner that the other plurality of busbars are partly exposed, wherein the stator is attached to a vehicle body of a vehicle, and the rotator is attached to a steering wheel of the vehicle, and wherein the other connection tool is housed in the stator and provided to be connectable with an electric circuit on a main body side of the vehicle.

8. The rotary connector device according to claim 5, further comprising at least another flexible flat cable wound on an outer peripheral side of the flexible flat cable in the annular space, wherein a length of the flexible flat cable that constitutes the connection structure body in the annular space is shorter than any length of the at least another flexible flat cable in the annular space.

9. The rotary connector device according to claim 6, further comprising at least another flexible flat cable wound on an outer peripheral side of the flexible flat cable in the annular space, wherein a length of the flexible flat cable that constitutes the connection structure body in the annular space is shorter than any length of the at least another flexible flat cable in the annular space.

10. The rotary connector device according to claim 7, further comprising at least another flexible flat cable wound on an outer peripheral side of the flexible flat cable in the annular space, wherein a length of the flexible flat cable that constitutes the connection structure body in the annular space is shorter than any length of the at least another flexible flat cable in the annular space.

\* \* \* \* \*